US 8,848,900 B2

(12) United States Patent  
Farmer (10) Patent No.: US 8,848,900 B2
(45) Date of Patent: Sep. 30, 2014

(54) SYSTEM AND METHOD FOR AUTOMATING SKILLSET ADDITIONS

(71) Applicant: Oracle International Corporation, Redwood Shores, CA (US)

(72) Inventor: Chad Farmer, Chicago, IL (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 13/761,521

(22) Filed: Feb. 7, 2013

(65) Prior Publication Data

US 2014/0219439 A1 Aug. 7, 2014

(51) Int. Cl.
*H04M 3/00* (2006.01)
*H04M 5/00* (2006.01)
*H04M 3/523* (2006.01)

(52) U.S. Cl.
CPC .................................. *H04M 3/5233* (2013.01)
USPC ............. 379/265.12; 379/265.03; 379/265.06

(58) Field of Classification Search
CPC ............ H04M 3/5233; H04M 3/5232; H04M 3/5183; H04M 3/523
USPC .......... 379/265.12, 265.06, 265.03, 242, 243, 379/265.11, 265.05, 265.01
See application file for complete search history.

(56) References Cited

U.S. PATENT DOCUMENTS

| | | | | |
|---|---|---|---|---|
| 2007/0201679 | A1* | 8/2007 | Baggenstoss et al. | ... 379/265.06 |
| 2008/0002823 | A1* | 1/2008 | Fama et al. | ............... 379/265.12 |
| 2011/0096919 | A1* | 4/2011 | Daye et al. | ............... 379/265.12 |
| 2012/0263293 | A1* | 10/2012 | Vasquez et al. | .......... 379/265.12 |

* cited by examiner

*Primary Examiner* — Thjuan K Addy
(74) *Attorney, Agent, or Firm* — Kilpatrick Townsend & Stockton LLP (57) ABSTRACT

Embodiments of the invention provide systems and methods for updating customer service agent skillset definitions within a customer relationship management system. According to one embodiment, updating a skillset definition for an agent in a Customer Relationship Management (CRM) system can comprise defining an initial skillset for the agent including indications of areas of expertise for which the agent is available to handle related customer requests. A request can be received from the agent to update the initial skillset definition to indicate a new area of expertise for which the agent wishes to be considered qualified. A determination can be made as to whether the agent is qualified for the new area of expertise. In response to determining the agent is qualified, the skillset for the agent can be updated to indicate the agent is qualified to begin handling customer requests related to the new area of expertise.

20 Claims, 6 Drawing Sheets

SYSTEM AND METHOD FOR AUTOMATING SKILLSET ADDITIONS

BACKGROUND OF THE INVENTION

Embodiments of the present invention relate generally to methods and systems for providing customer service and more particularly to enhancing and updating customer service agent skillset definitions within a customer relationship management system.

Customer Relationship Management (CRM) systems provide support for customers of a product or service by allowing those users to make requests for service that can include a question posed by the user related to the product or service. For example, a user may log onto or access a CRM system provided by a manufacturer of cellphones and request information related to use of that device and that may include a question such as "How do I adjust the brightness of the display?" Generally speaking, these systems receive requests for service, e.g., in the form of a phone call, web page form, instant message, email, etc., and route the requests to a human agent for addressing the request and providing an answer to the question. In many cases, the agent is selected based on the topic of the question or request and a predefined profile of that agent that includes indications of the agent's skills and/or expertise.

In existing CRM systems, these skillset definitions for each agent are defined when the profile for that agent is initially generated and may be periodically updated to reflect changes in the agent's qualifications. For example, a particular agent's profile may be updated based on an annual or periodic performance evaluation. These updates are made in existing CRM systems by a manager, supervisor, system administrator, or other responsible person manually updating the agent's profile, perhaps through an administration interface of the CRM application. Such manual operations are tedious, time-consuming, error prone, and inefficient. Furthermore, such an approach does not provide a way for the agent to easily take initiative, based on her own interest or goals, to seek and/or request changes to her own skillset. Thus, agents may find themselves pigeonholed into sometimes narrowly defined roles in spite of their own desires. Hence, there is a need for improved methods and systems for enhancing and updating customer service agent skillset definitions.

BRIEF SUMMARY OF THE INVENTION

Embodiments of the invention provide systems and methods for updating customer service agent skillset definitions within a customer relationship management system. According to one embodiment, updating a skillset definition for an agent in a Customer Relationship Management (CRM) system can comprise defining, by the CRM system, an initial skillset for the agent. The initial skillset can include indications of areas of expertise for which the agent is available to handle related customer requests. A request can be received by the CRM system from the agent to update the initial skillset definition. The request can indicate a new area of expertise for which the agent wishes to be considered qualified. A determination can be made by the CRM system as to whether the agent is qualified for the new area of expertise. In response to determining the agent is qualified for the new area of expertise, the skillset for the agent can be updated by the CRM system to indicate the agent is qualified to begin handling customer requests related to the new area of expertise. In response to determining the agent is not qualified for the new area of expertise, training can be provided to the agent, by the CRM system, for the new area of expertise. A determination can be made, by the CRM system, as to whether the agent has completed the provided training and has become qualified for the new area of expertise. In response to determining the agent has completed the provided training and has become qualified for the new area of expertise, the skillset for the agent can be updated by the CRM system to indicate the agent is qualified to begin handling customer requests related to the new area of expertise.

Once qualified, the agent can be identified by the CRM system as available to begin handling customer requests related to the new area of expertise. At some time thereafter, a customer request related to the new area of expertise can be routed by the CRM system to the agent. For example, routing the customer request related to the new area of expertise to the agent can comprise receiving the customer request, evaluating the customer request to identify a nature of the request, determining whether the agent is eligible to handle the customer request based at least in part on evaluating the customer request, and in response to determining the agent is eligible to handle the customer request, further identifying the agent as appropriate for handling the customer request and routing, by the CRM system, the customer request to the agent.

In some cases, performance of the agent in handling the routed customer request can be evaluated by the CRM system and a rating for the agent in the new area of expertise can be updated by the CRM system based on evaluating the performance of the agent in handling the routed customer request. For example, evaluating the performance of the agent in handling the routed customer request can comprise receiving results for the agent handling the customer request, the results indicating a disposition of the customer request. A determination can be made as to whether the agent completed handling of the customer request or forwarded the customer request to another agent based on the disposition of the customer request. In response to determining the agent forwarded the customer request to another agent, an incident record for the customer request can be recorded and the skillset for the agent can be updated to identify the incident record and record a neutral score for the incident record. In response to determining the agent did not forward the customer request to another agent, a further determination can be made as to whether the customer request was handled satisfactorily by the agent based on the disposition of the customer request. In response to determining the customer request was handled satisfactorily by the agent, an incident record for the customer request can be recorded and the skillset for the agent can be updated to identify the incident record and record a positive score for the incident record. In response to determining the customer request was not handled satisfactorily by the agent, an incident record for the customer request can be recorded and the skillset for the agent can be updated to identify the incident record and record a negative score for the incident record.

DETAILED DESCRIPTION OF THE INVENTION

In the following description, for the purposes of explanation, numerous specific details are set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable medium" includes, but is not limited to portable or fixed storage devices, optical storage devices, wireless channels and various other mediums capable of storing, containing or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Embodiments of the invention provide systems and methods for managing a customer relationship management system. More specifically, embodiments of the present invention provide for enhancing and updating customer service agent skillset definitions within a customer relationship management system. The CRM system can support a number of users, such as end users of a product or service, can receive requests for support or service from those users, and process those requests in order to provide the requesting users with answers to questions posed in the requests. For example, processing requests from these users or customers can include evaluating the request to determine a nature of the request, e.g., the subject matter, complexity, etc., and selecting an agent most suited to handle that request based at least in part on the profiles of the available agents and that include definitions of their individual skillsets. Embodiments of the present invention provide for updating these skillset definitions in response to and/or based on requests from the agents themselves. Thus, agents can self-guide and initiate updates to their own skillsets based on their own interests, goals, etc. In some cases, if the agent is not yet qualified to have the requested skills added to their profile, training may be provided in various forms until the agent obtains any prerequisite level of knowledge or skill. Then, once the agent is considered to be qualified, customer requests can be routed to that agent, in some cases on a limited or trial basis. The requests handled by the agent can be evaluated and the agent can be scored on the handling of these new areas of expertise. Once the agent has a particular score or various levels of scores, the agent can be considered adequately or more fully qualified. Various additional details of embodiments of the present invention will be described below with reference to the figures.

Figure 1:
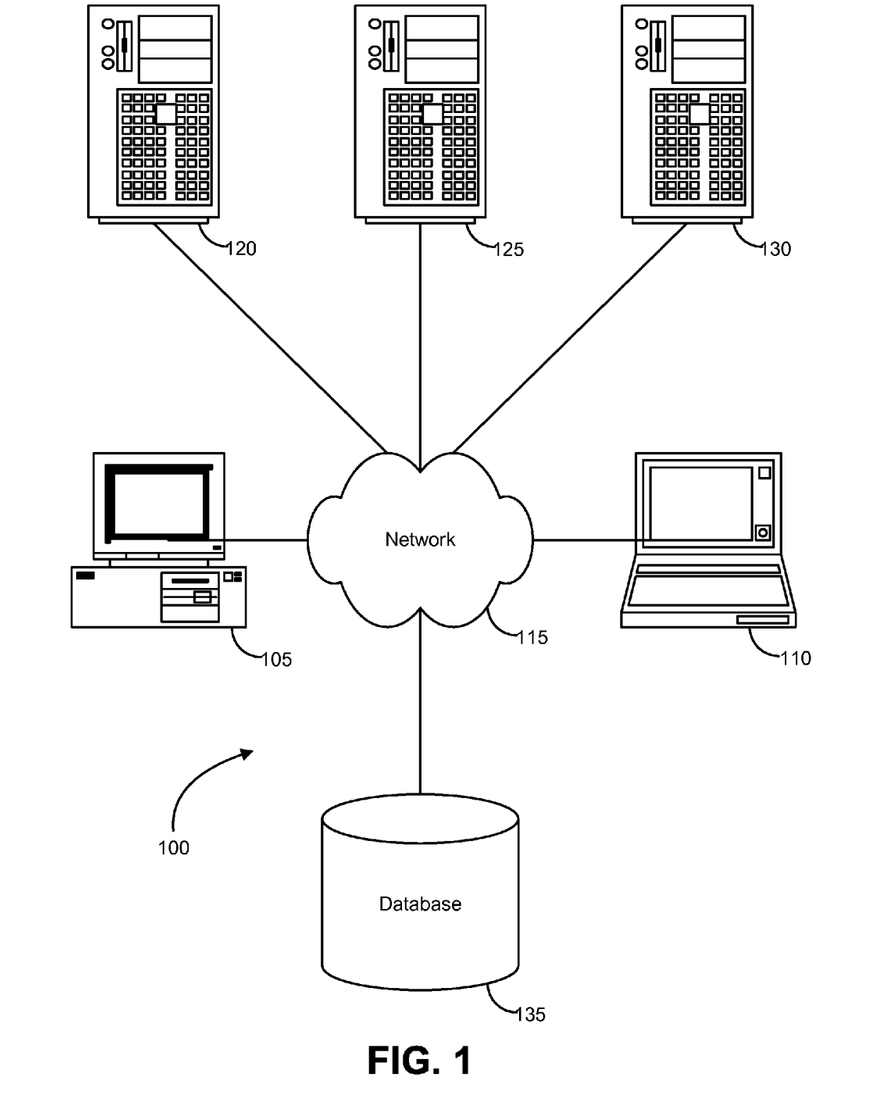
FIG. 1 is a block diagram illustrating components of an exemplary operating environment in which various embodiments of the present invention may be implemented.

FIG. 1 is a block diagram illustrating components of an exemplary operating environment in which various embodiments of the present invention may be implemented. The system 100 can include one or more user computers 105, 110, which may be used to operate a client, whether a dedicate application, web browser, etc. The user computers 105, 110 can be general purpose personal computers (including, merely by way of example, personal computers and/or laptop computers running various versions of Microsoft Corp.'s Windows and/or Apple Corp.'s Macintosh operating systems) and/or workstation computers running any of a variety of commercially-available UNIX or UNIX-like operating systems (including without limitation, the variety of GNU/Linux operating systems). These user computers 105, 110 may also have any of a variety of applications, including one or more development systems, database client and/or server applications, and web browser applications. Alternatively, the user computers 105, 110 may be any other electronic device, such as a thin-client computer, Internet-enabled mobile telephone, and/or personal digital assistant, capable of communicating via a network (e.g., the network 115 described below) and/or displaying and navigating web pages or other types of electronic documents. Although the exemplary system 100 is shown with two user computers, any number of user computers may be supported.

In some embodiments, the system 100 may also include a network 115. The network may can be any type of network familiar to those skilled in the art that can support data communications using any of a variety of commercially-available protocols, including without limitation TCP/IP, SNA, IPX, AppleTalk, and the like. Merely by way of example, the network 115 maybe a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, the Bluetooth protocol known in the art, and/or any other wireless protocol); and/or any combination of these and/or other networks such as GSM, GPRS, EDGE, UMTS, 3G, 2.5 G, CDMA, CDMA2000, WCDMA, EVDO etc.

The system may also include one or more server computers 120, 125, 130 which can be general purpose computers and/or specialized server computers (including, merely by way of example, PC servers, UNIX servers, mid-range servers, mainframe computers rack-mounted servers, etc.). One or more of the servers (e.g., 130) may be dedicated to running applications, such as a business application, a web server, application server, etc. Such servers may be used to process requests from user computers 105, 110. The applications can also include any number of applications for controlling access to resources of the servers 120, 125, 130.

The web server can be running an operating system including any of those discussed above, as well as any commercially-available server operating systems. The web server can also run any of a variety of server applications and/or mid-tier applications, including HTTP servers, FTP servers, CGI servers, database servers, Java servers, business applications, and the like. The server(s) also may be one or more computers which can be capable of executing programs or scripts in response to the user computers 105, 110. As one example, a server may execute one or more web applications. The web application may be implemented as one or more scripts or programs written in any programming language, such as Java™, C, C# or C++, and/or any scripting language, such as Perl, Python, or TCL, as well as combinations of any programming/scripting languages. The server(s) may also include database servers, including without limitation those commercially available from Oracle®, Microsoft®, Sybase®, IBM® and the like, which can process requests from database clients running on a user computer 105, 110.

In some embodiments, an application server may create web pages dynamically for displaying on an end-user (client) system. The web pages created by the web application server may be forwarded to a user computer 105 via a web server. Similarly, the web server can receive web page requests and/or input data from a user computer and can forward the web page requests and/or input data to an application and/or a database server. Those skilled in the art will recognize that the functions described with respect to various types of servers may be performed by a single server and/or a plurality of specialized servers, depending on implementation-specific needs and parameters.

The system 100 may also include one or more databases 135. The database(s) 135 may reside in a variety of locations. By way of example, a database 135 may reside on a storage medium local to (and/or resident in) one or more of the computers 105, 110, 115, 125, 130. Alternatively, it may be remote from any or all of the computers 105, 110, 115, 125, 130, and/or in communication (e.g., via the network 120) with one or more of these. In a particular set of embodiments, the database 135 may reside in a storage-area network ("SAN") familiar to those skilled in the art. Similarly, any necessary files for performing the functions attributed to the computers 105, 110, 115, 125, 130 may be stored locally on the respective computer and/or remotely, as appropriate. In one set of embodiments, the database 135 may be a relational database, such as Oracle 10g, that is adapted to store, update, and retrieve data in response to SQL-formatted commands.

Figure 2:
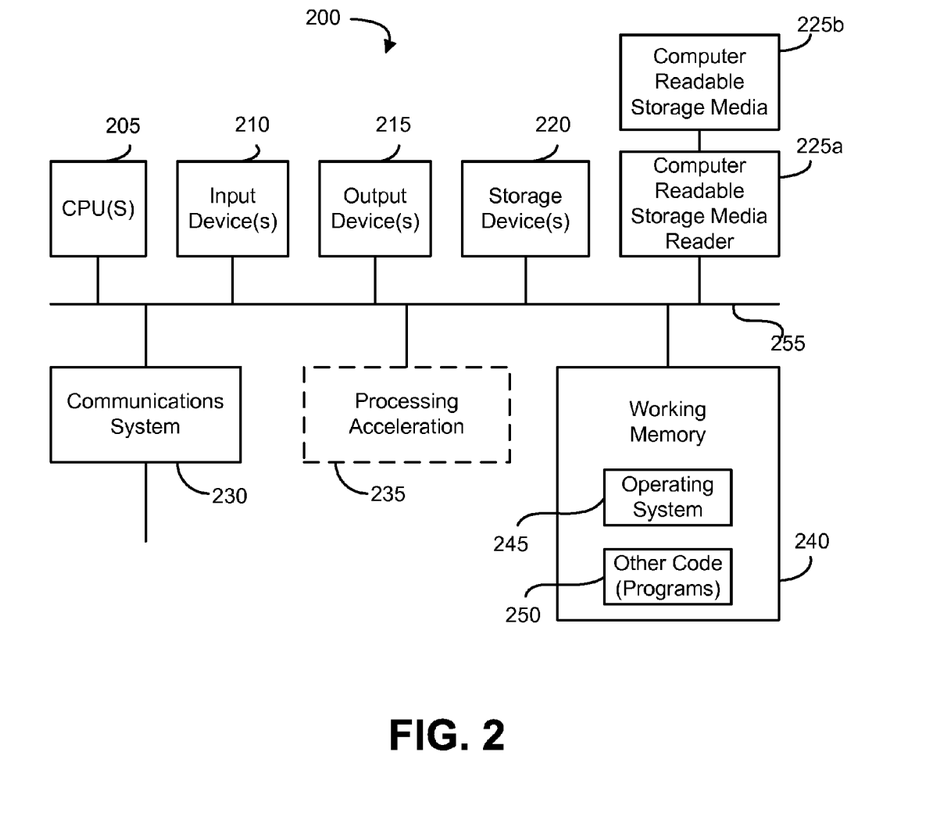
FIG. 2 is a block diagram illustrating an exemplary computer system in which embodiments of the present invention may be implemented.

FIG. 2 illustrates an exemplary computer system 200, in which various embodiments of the present invention may be implemented. The system 200 may be used to implement any of the computer systems described above. The computer system 200 is shown comprising hardware elements that may be electrically coupled via a bus 255. The hardware elements may include one or more central processing units (CPUs) 205, one or more input devices 210 (e.g., a mouse, a keyboard, etc.), and one or more output devices 215 (e.g., a display device, a printer, etc.). The computer system 200 may also include one or more storage device 220. By way of example, storage device(s) 220 may be disk drives, optical storage devices, solid-state storage device such as a random access memory ("RAM") and/or a read-only memory ("ROM"), which can be programmable, flash-updateable and/or the like.

The computer system 200 may additionally include a computer-readable storage media reader 225a, a communications system 230 (e.g., a modem, a network card (wireless or wired), an infra-red communication device, etc.), and working memory 240, which may include RAM and ROM devices as described above. In some embodiments, the computer system 200 may also include a processing acceleration unit 235, which can include a DSP, a special-purpose processor and/or the like.

The computer-readable storage media reader 225a can further be connected to a computer-readable storage medium 225b, together (and, optionally, in combination with storage device(s) 220) comprehensively representing remote, local, fixed, and/or removable storage devices plus storage media for temporarily and/or more permanently containing computer-readable information. The communications system 230 may permit data to be exchanged with the network 220 and/or any other computer described above with respect to the system 200.

The computer system 200 may also comprise software elements, shown as being currently located within a working memory 240, including an operating system 245 and/or other code 250, such as an application program (which may be a client application, web browser, mid-tier application, RDBMS, etc.). It should be appreciated that alternate embodiments of a computer system 200 may have numerous variations from that described above. For example, customized hardware might also be used and/or particular elements might be implemented in hardware, software (including portable software, such as applets), or both. Further, connection to other computing devices such as network input/output devices may be employed. Software of computer system 200 may include code 250 for implementing embodiments of the present invention as described herein.

Figure 3:
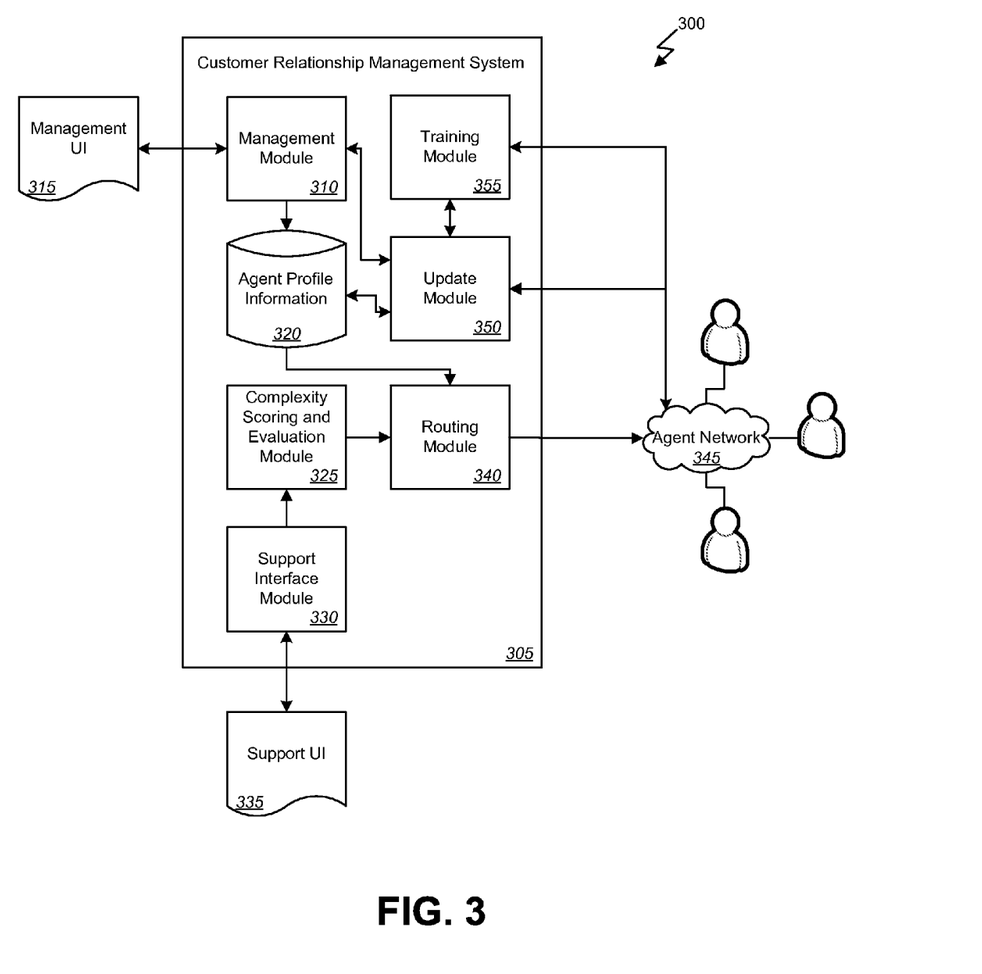
FIG. 3 is a block diagram illustrating, at a high-level, functional components of a system for enhancing and updating customer service agent skillset definitions within a customer relationship management system according to one embodiment of the present invention.

FIG. 3 is a block diagram illustrating, at a high-level, functional components of a system for enhancing and updating customer service agent skillset definitions within a customer relationship management system according to one embodiment of the present invention. In this example, the system 300 includes a Customer Relationship Management (CRM) system 305 such as may be executed on a server or another computer or computing device as described above. The CRM system 305 can include a management module 310 which provides a management user interface 315 such as a set of web pages or other interface. Through this interface 315, a supervisor, manager, administrator, etc. can interact with the management module 310 to define agent profile information 320 for each of one or more customer service agents 345. Generally speaking, the profile information 320 can include information indicating topics or areas of expertise for which a particular agent is considered qualified to answer customer questions or requests.

Additionally, the CRM system 305 can support a number of users, such as end users of a product or service, can receive requests for support or service from those users, and process those requests in order to connect or direct the requesting users to one or more agents 345 for answers to questions posed in the requests. For example, a support interface module 330 of the CRM system 305 can provide one or more interfaces 335 including but not limited to web pages, email addresses, phone lines, chat and/or instant messaging, and/or any of a variety of other communication channels to customer users of the system. Through these channels/interfaces 335, the customers can make requests for support that may include questions to be answered by the agents 345. Once received, these requests and/or questions can be evaluated by an evaluation module 325. This evaluation can include determining a content or topic of the request, determining a complexity score indicating a relative difficulty of the request or questions, etc. Based on this evaluation and the agent profile information 320, a routing module 340 of the CRM system can then direct the request and/or question to a selected agent with matching expertise. That is, the routing module can identify an agent with a skillset that is appropriate for the nature of the request and then connect the customer with that agent through email, phone, chat and/or instant messaging, and/or any of a variety of other communication channels.

As noted above, embodiments of the present invention provide for enhancing and updating customer service agent skillset definitions in the agent profile information 320 of the CRM system 305. More specifically, embodiments of the present invention provide for updating these skillset definitions in response to and/or based on requests from the agents 345 themselves. For example, the CRM system 305 can include an update module 350 accessible by the agents 345 via an interface (not shown here) over a network. Through the update module 350 agents can make requests for changes to the areas of expertise for which they are considered qualified. For example, an agent may request to be added to a particular product line or service. In another example, the agent may have language skills that are not being utilized and may wish to be considered competent to handle customer requests in a particular language or for a particular region. Thus, agents 345 can self-guide and initiate updates to their own skillsets based on their own interests, goals, etc.

In other words, an initial skillset can be defined for the agent through a management module 310 of the CRM system 305 and stored in a set of agent profile information 320. The initial skillset can include indications of areas of expertise for which the agent is available to handle related customer requests. At some point in time after definition of the original profile, a request can be received from the agent through the update module 350 to update the initial skillset definition. The request can indicate a new area of expertise for which the agent wishes to be considered qualified. A determination can be made as to whether the agent is qualified for the new area of expertise. For example, the management module 310 can compare the requested update to information already in the agent profile information 320 to determine if the agent has the requested skills. Additionally or alternatively, the management module 310 can request through the management interface 315 or other means an approval for the request from a manager, supervisor, administrator, or other party. In response to determining the agent is qualified for the new area of expertise, the skillset for the agent stored in the agent profile information 320 can be updated by the update module 350 to indicate the agent is qualified to begin handling customer requests related to the new area of expertise.

According to one embodiment, in response to determining the agent is not qualified for the new area of expertise, training can be provided to the agent for the new area of expertise. For example, a training module 355 of the CRM system 305 may provide an online training course, tutorial, exam, etc. related to the agent's requested area of expertise which should be completed by the agent to be considered qualified for the requested area of expertise. After some time, a determination can be made by the training module 355 as to whether the agent has completed the provided training and any requisite exams or other qualification criteria. If the agent has completed the training, another determination can be made by the management module 310 as to whether the agent has now become qualified for the new area of expertise. In response to determining the agent has completed the provided training and determining the agent is now qualified for the new area of expertise, the skillset for the agent stored in the agent profile information 320 can be updated by the update module and/or management module 310 to indicate the agent is qualified to begin handling customer requests related to the new area of expertise.

Once the agent is qualified, the agent can be identified as available to begin handling customer requests related to the new area of expertise. That is, the agent can be considered to for handling, on a limited basis, some relatively simple requests for the sake of evaluating the agent's abilities. For example, the agent profile information 320 may indicate the agent is considered a trainee in the new area of expertise and thus only those requests with a very low complexity score can be routed to that agent for a time. So at some point, a customer request related to the new area of expertise can be routed to the agent by the routing module 340 for handling and performance of the agent in handling the routed customer request can be evaluated and a rating for the agent in the new area of expertise can be updated based on evaluating the performance of the agent in handling the routed customer request.

Evaluating the performance of the agent in handling the routed customer request can begin with receiving results for the agent handling the customer request, the results indicating a disposition of the customer request. For example, a quality review, a customer survey, or other feedback about the handling of the request by the agent can be collected from the customer through the support interface module 330. Additionally or alternatively, such information may be collected from a supervisor or administrator through the management module 310. The disposition of the request can include the agent forwarding the request to another agent for handling. i.e., the agent decided he could not adequately handle the request and sent it on to another, more able agent, or handled the request himself, either to a successful resolution or otherwise.

Thus, a determination can be made, for example by the management module 310, as to whether the agent forwarded the customer request to another agent. In response to the management module 310 determining the agent forwarded the customer request to another agent, an incident record (not shown here) can be recorded for the customer request and the skillset for the agent in the agent profile information 320 can be updated by the management module 310 to identify the incident record and record a neutral score for the incident record. In response to the management module 310 determining the agent did not forward the customer request to another agent, a determination can be made by the management module 310 as to whether the customer request was handled satisfactorily by the agent based on the disposition of the customer request. In response to the management module 310 determining the customer request was handled satisfactorily by the agent, an incident record (not shown here) can be recorded for the customer request and the skillset for the agent stored in the agent profile information 320 can be updated by the management module 310 to identify the incident record and record a positive score for the incident record. In response to the management module 310 determining the customer request was not handled satisfactorily by the agent, an incident record (not shown here) can be recorded for the customer request and the skillset for the agent stored in the agent profile information 320 can be updated by the management module 310 to identify the incident record and record a negative score for the incident record.

In this way, an agent and independently, i.e., without initial involvement by a supervisor or manager, request an update in her skillset based on her own interest and initiative. In some cases, training may be provided and even required as part of the update process. Once such prerequisites have been satisfactorily completed, the agent can be allowed to begin handling some customer requests in an evaluation process. That is, the newly updated agent may be identified as a trainee or as being in a probation or evaluation period. During this time, the agent can be given relatively simple request to handle and can be evaluated based on resolution of those requests. So, as the agent successfully handles such requests and accumulates an adequate score or level, that agent can be made available, i.e., considered qualified for, increasingly complex requests. The additional skillset and levels or qualifications achieved may be associated with various incentives such as higher pay scales, bonuses, advancement opportunities, etc.

Figure 4:
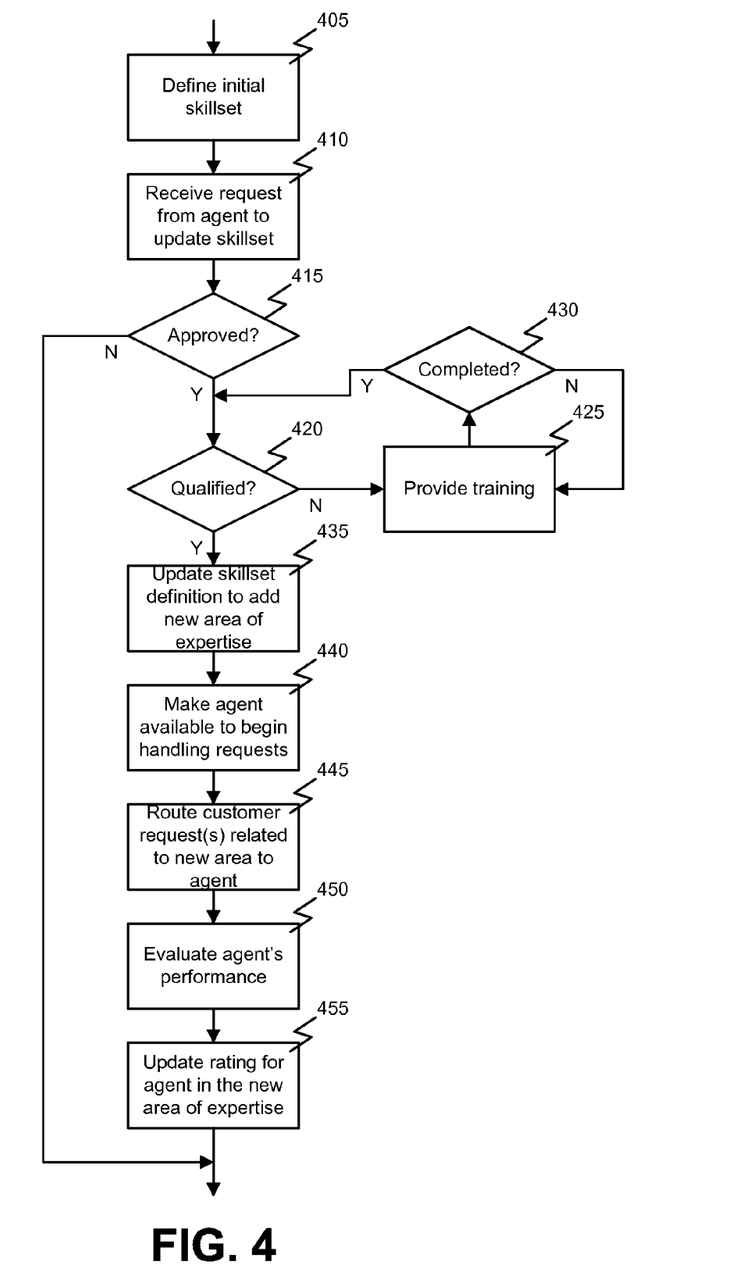
FIG. 4 is a flowchart illustrating a process for updating customer service agent skillset definitions within a customer relationship management system according to one embodiment of the present invention.

FIG. 4 is a flowchart illustrating a process for updating customer service agent skillset definitions within a customer relationship management system according to one embodiment of the present invention. In this example, updating a skillset definition for an agent in a Customer Relationship Management (CRM) system can begin with defining 405 an initial skillset for the agent. The initial skillset can include indications of areas of expertise for which the agent is available to handle related customer requests. A request can be received 410 from the agent to update the initial skillset definition. The request can indicate a new area of expertise for which the agent wishes to be considered qualified. A determination 420 can be made as to whether the agent is qualified for the new area of expertise. In response to determining 420 the agent is qualified for the new area of expertise, the skillset for the agent can be updated 435 to indicate the agent is qualified to begin handling customer requests related to the new area of expertise.

According to one embodiment, in response to determining 420 the agent is not qualified for the new area of expertise, training can be provided 425 to the agent for the new area of expertise. After some time, a determination 430 can be made as to whether the agent has completed the provided training. If 430 the agent has completed the training, another determination 420 can be made as to whether the agent has now become qualified for the new area of expertise. In response to determining 430 the agent has completed the provided training and determining 420 the agent is now qualified for the new area of expertise, the skillset for the agent can be updated 435 to indicate the agent is qualified to begin handling customer requests related to the new area of expertise.

Once the agent is qualified, the agent can be identified 440 as available to begin handling customer requests related to the new area of expertise. At some point, a customer request related to the new area of expertise can be routed 45 to the agent for handling. Performance of the agent in handling the routed customer request can be evaluated 450 and a rating for the agent in the new area of expertise can be updated 455 based on evaluating the performance of the agent in handling the routed customer request. Additional details of exemplary processes for routing requests and evaluating agent performance will be described below with reference to FIGS. 5 and 6.

Figure 5:
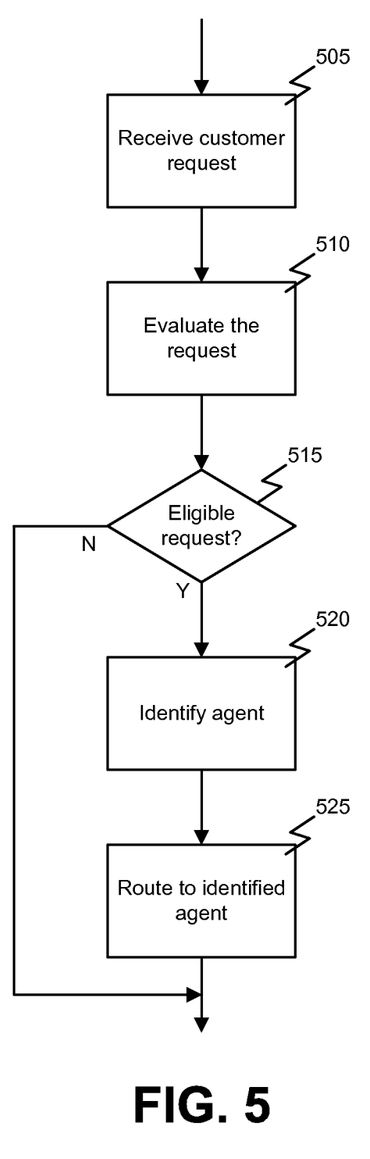
FIG. 5 is a flowchart illustrating a process for routing of customer service questions or requests within a customer relationship management system according to one embodiment of the present invention.

FIG. 5 is a flowchart illustrating a process for routing of customer service questions or requests within a customer relationship management system according to one embodiment of the present invention. In this example, routing the customer request related to the new area of expertise to the agent can comprise receiving 505 the customer request and evaluating 510 the customer request to identify a nature of the request. This evaluation can include considerations such as a complexity score for the request, a determined subject matter for the request, the customer making the request and any agreements or other definitions of required treatment for that customer, current workloads of the agents etc.

A determination 515 can be made as to whether the agent is eligible to handle the customer request based at least in part on evaluating the customer request, i.e., based on the complexity score, subject matter, requesting customer, etc. In response to determining 515 the agent is eligible to handle the customer request, routing can further include identifying 520 the agent as appropriate for handling the customer request and routing 525 the customer request to the agent.

Figure 6:
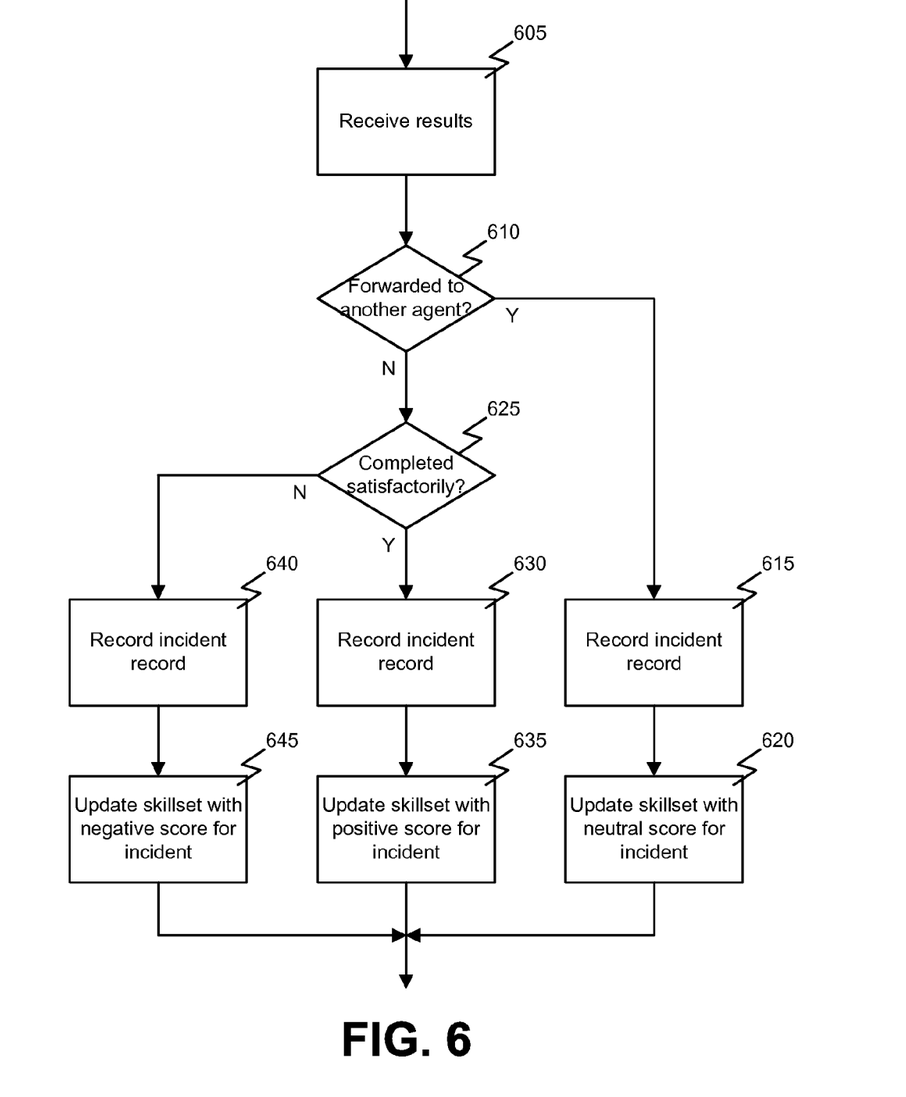
FIG. 6 is a flowchart illustrating a process for evaluating and rating updated customer service agent skillset definitions within a customer relationship management system according to one embodiment of the present invention.

FIG. 6 is a flowchart illustrating a process for evaluating and rating updated customer service agent skillset definitions within a customer relationship management system according to one embodiment of the present invention. Evaluating the performance of the agent in handling the routed customer request can begin with receiving 605 results for the agent handling the customer request, the results indicating a disposition of the customer request. For example, a quality review, a customer survey, or other feedback can be collected about the handling of the request. A determination 610 can be made as to whether the agent forwarded the customer request to another agent. In response to determining 610 the agent forwarded the customer request to another agent, an incident record can be recorded 615 for the customer request and the skillset for the agent can be updated 620 to identify the incident record and record a neutral score for the incident record.

In response to determining the agent did not forward the customer request to another agent, a determination 625 can be made as to whether the customer request was handled satisfactorily by the agent based on the disposition of the customer request. In response to determining 625 the customer request was handled satisfactorily by the agent, an incident record can be recorded 630 for the customer request and the skillset for the agent can be updated 635 to identify the incident record and record a positive score for the incident record. In response to determining 625 the customer request was not handled satisfactorily by the agent, an incident record can be recorded 640 for the customer request and the skillset for the agent can be updated 645 to identify the incident record and record a negative score for the incident record.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. A method for updating a skillset definition for an agent in a Customer Relationship Management (CRM) system, the method comprising:
    defining, by the CRM system, an initial skillset for the agent, the initial skillset including indications of areas of expertise for which the agent is available to handle related customer requests;
    receiving, by the CRM system, a request from the agent to update the initial skillset definition, the request indicating a new area of expertise for which the agent wishes to be considered qualified, the new area of expertise comprising an area of expertise not indicated in the initial skillset for the agent;
    determining, by the CRM system, whether the agent is qualified for the new area of expertise; and
    in response to determining the agent is qualified for the new area of expertise, updating, by the CRM system, the skillset for the agent to indicate the agent is qualified to begin handling customer requests related to the new area of expertise.

2. The method of claim 1, further comprising:
    in response to determining the agent is not qualified for the new area of expertise, providing, by the CRM system, training to the agent for the new area of expertise;
    determining, by the CRM system, whether the agent has completed the provided training and has become qualified for the new area of expertise; and
    in response to determining the agent has completed the provided training and has become qualified for the new area of expertise, updating, by the CRM system, the skillset for the agent to indicate the agent is qualified to begin handling customer requests related to the new area of expertise.

3. The method of claim 1, further comprising:
    identifying, by the CRM system, the agent available to begin handling customer requests related to the new area of expertise;
    routing, by the CRM system, a customer request related to the new area of expertise to the agent;
    evaluating, by the CRM system, performance of the agent in handling the routed customer request; and
    updating, by the CRM system, a rating for the agent in the new area of expertise based on evaluating the performance of the agent in handling the routed customer request.

4. The method of claim 3, wherein routing the customer request related to the new area of expertise to the agent comprises:
    receiving, by the CRM system, the customer request;
    evaluating, by the CRM system, the customer request to identify a nature of the request;
    determining, by the CRM system, whether the agent is eligible to handle the customer request based at least in part on evaluating the customer request; and
    in response to determining the agent is eligible to handle the customer request, further identifying, by the CRM system, the agent as appropriate for handling the customer request and routing, by the CRM system, the customer request to the agent.

5. The method of claim 3, wherein evaluating the performance of the agent in handling the routed customer request comprises:
    receiving, by the CRM system, results for the agent handling the customer request, the results indicating a disposition of the customer request;
    determining, by the CRM system, whether the agent completed handling of the customer request or forwarded the customer request to another agent based on the disposition of the customer request; and
    in response to determining the agent forwarded the customer request to another agent, recording, by the CRM system, an incident record for the customer request and updating, by the CRM system, the skillset for the agent to identify the incident record and record a neutral score for the incident record.

6. The method of claim 5, further comprising in response to determining the agent did not forward the customer request to another agent:
    determining, by the CRM system, whether the customer request was handled satisfactorily by the agent based on the disposition of the customer request; and
    in response to determining the customer request was handled satisfactorily by the agent, recording, by the CRM system, an incident record for the customer request and updating, by the CRM system, the skillset for the agent to identify the incident record and record a positive score for the incident record.

7. The method of claim 6, further comprising in response to determining the customer request was not handled satisfactorily by the agent, recording, by the CRM system, an incident record for the customer request and updating, by the CRM system, the skillset for the agent to identify the incident record and record a negative score for the incident record.

8. A system comprising:
    a processor; and
    a memory coupled with and readable by the processor and storing therein a set of instructions which, when executed by the processor, cause the processor to update a skillset definition for an agent in a Customer Relationship Management (CRM) system by:
    defining an initial skillset for the agent, the initial skillset including indications of areas of expertise for which the agent is available to handle related customer requests;
    receiving a request from the agent to update the initial skillset definition, the request indicating a new area of expertise for which the agent wishes to be considered qualified, the new area of expertise comprising an area of expertise not indicated in the initial skillset for the agent;

determining whether the agent is qualified for the new area of expertise; and in response to determining the agent is qualified for the new area of expertise, updating the skillset for the agent to indicate the agent is qualified to begin handling customer requests related to the new area of expertise.

9. The system of claim 8, further comprising:

in response to determining the agent is not qualified for the new area of expertise, providing training to the agent for the new area of expertise;

determining whether the agent has completed the provided training and has become qualified for the new area of expertise; and in response to determining the agent has completed the provided training and has become qualified for the new area of expertise, updating the skillset for the agent to indicate the agent is qualified to begin handling customer requests related to the new area of expertise.

10. The system of claim 8, further comprising:

identifying the agent available to begin handling customer requests related to the new area of expertise;

routing a customer request related to the new area of expertise to the agent;

evaluating performance of the agent in handling the routed customer request; and updating a rating for the agent in the new area of expertise based on evaluating the performance of the agent in handling the routed customer request.

11. The system of claim 10, wherein routing the customer request related to the new area of expertise to the agent comprises:

receiving the customer request;

evaluating the customer request to identify a nature of the request;

determining whether the agent is eligible to handle the customer request based at least in part on evaluating the customer request; and in response to determining the agent is eligible to handle the customer request, further identifying the agent as appropriate for handling the customer request and routing the customer request to the agent.

12. The system of claim 10, wherein evaluating the performance of the agent in handling the routed customer request comprises:

receiving results for the agent handling the customer request, the results indicating a disposition of the customer request;

determining whether the agent completed handling of the customer request or forwarded the customer request to another agent based on the disposition of the customer request; and in response to determining the agent forwarded the customer request to another agent, recording an incident record for the customer request and updating the skillset for the agent to identify the incident record and record a neutral score for the incident record.

13. The system of claim 12, further comprising in response to determining the agent did not forward the customer request to another agent:

determining whether the customer request was handled satisfactorily by the agent based on the disposition of the customer request; and in response to determining the customer request was handled satisfactorily by the agent, recording an incident record for the customer request and updating the skillset for the agent to identify the incident record and record a positive score for the incident record.

14. The system of claim 13, further comprising in response to determining the customer request was not handled satisfactorily by the agent, recording an incident record for the customer request and updating the skillset for the agent to identify the incident record and record a negative score for the incident record.

15. A computer-readable memory device storing therein a set of instructions which, when executed by the processor, cause the processor to update a skillset definition for an agent in a Customer Relationship Management (CRM) system by:

defining an initial skillset for the agent, the initial skillset including indications of areas of expertise for which the agent is available to handle related customer requests;

receiving a request from the agent to update the initial skillset definition, the request indicating a new area of expertise for which the agent wishes to be considered qualified, the new area of expertise comprising an area of expertise not indicated in the initial skillset for the agent;

determining whether the agent is qualified for the new area of expertise; and in response to determining the agent is qualified for the new area of expertise, updating the skillset for the agent to indicate the agent is qualified to begin handling customer requests related to the new area of expertise.

16. The computer-readable memory device of claim 15, further comprising:

in response to determining the agent is not qualified for the new area of expertise, providing training to the agent for the new area of expertise;

determining whether the agent has completed the provided training and has become qualified for the new area of expertise; and in response to determining the agent has completed the provided training and has become qualified for the new area of expertise, updating the skillset for the agent to indicate the agent is qualified to begin handling customer requests related to the new area of expertise.

17. The computer-readable memory device of claim 15, further comprising:

identifying the agent available to begin handling customer requests related to the new area of expertise;

routing a customer request related to the new area of expertise to the agent;

evaluating performance of the agent in handling the routed customer request; and updating a rating for the agent in the new area of expertise based on evaluating the performance of the agent in handling the routed customer request.

18. The computer-readable memory device of claim 17, wherein routing the customer request related to the new area of expertise to the agent comprises:

receiving the customer request;

evaluating the customer request to identify a nature of the request;

determining whether the agent is eligible to handle the customer request based at least in part on evaluating the customer request; and in response to determining the agent is eligible to handle the customer request, further identifying the agent as appropriate for handling the customer request and routing the customer request to the agent.

19. The computer-readable memory device of claim 17, wherein evaluating the performance of the agent in handling the routed customer request comprises:

receiving results for the agent handling the customer request, the results indicating a disposition of the customer request;

determining whether the agent completed handling of the customer request or forwarded the customer request to another agent based on the disposition of the customer request; and in response to determining the agent forwarded the customer request to another agent, recording an incident record for the customer request and updating the skillset for the agent to identify the incident record and record a neutral score for the incident record.

20. The computer-readable memory device of claim 19, further comprising in response to determining the agent did not forward the customer request to another agent:

determining whether the customer request was handled satisfactorily by the agent based on the disposition of the customer request;

in response to determining the customer request was handled satisfactorily by the agent, recording an incident record for the customer request and updating the skillset for the agent to identify the incident record and record a positive score for the incident record; and in response to determining the customer request was not handled satisfactorily by the agent, recording an incident record for the customer request and updating the skillset for the agent to identify the incident record and record a negative score for the incident record.

* * * * *